United States Patent [19]

Pomfret

[11] Patent Number: 4,543,628
[45] Date of Patent: Sep. 24, 1985

[54] BUS FOR DATA PROCESSING SYSTEM WITH FAULT CYCLE OPERATION

[75] Inventor: Stephen T. Pomfret, Maynard, Mass.

[73] Assignee: Digital Equipment Corporation, Maynard, Mass.

[21] Appl. No.: 461,838

[22] Filed: Jan. 28, 1983

[51] Int. Cl.[4] .................... G06F 13/00; G06F 11/00
[52] U.S. Cl. .................................. 364/200; 371/32; 371/48
[58] Field of Search ... 364/200 MS File, 900 MS File; 370/13; 371/48, 67, 32, 30, 33, 16, 21

[56] References Cited

U.S. PATENT DOCUMENTS

| 3,824,547 | 7/1974 | Green et al. | 371/32 |
| 3,932,841 | 1/1976 | Deerfield et al. | 371/32 |
| 3,956,589 | 5/1976 | Weathers et al. | 371/32 |
| 3,997,896 | 12/1976 | Cassarino, Jr. et al. | 364/200 |
| 4,149,142 | 4/1979 | Kageyama et al. | 371/32 |
| 4,232,366 | 11/1980 | Levy et al. | 364/200 |
| 4,304,001 | 12/1981 | Cope | 371/32 |
| 4,348,722 | 9/1982 | Gunter et al. | 371/32 |

OTHER PUBLICATIONS

"A Systematic Approach to the Design of Digital Bussing Structures" by K. Thurber et al.; Fall Joint Computer Conference; 1972, pp. 719-740.
Systems Engineering Laboratories, Technical Manual-32/70 Series Computer; Publication No. 303-3200-70-000; Apr. 1974; pp. 6-1 to 6-8.

Primary Examiner—Raulfe B. Zache
Assistant Examiner—William G. Niessen
Attorney, Agent, or Firm—Cesari and McKenna

[57] ABSTRACT

A digital data processing system including a number of input/output units that communicate with a memory over an input/output bus and through an input/output interface. The input/output interface pipelines data transfers between the input/output units and the memory. The interface includes an incoming and outgoing buffer for queuing requests from the input/output units, and transfers from the memory. In the event of an error in the input/output interface's pipeline buffer, the interface transmits, by means of a fault cycle over the bus, information to the input/output unit that initiated the transfer unit to enable it to recover.

9 Claims, 9 Drawing Figures

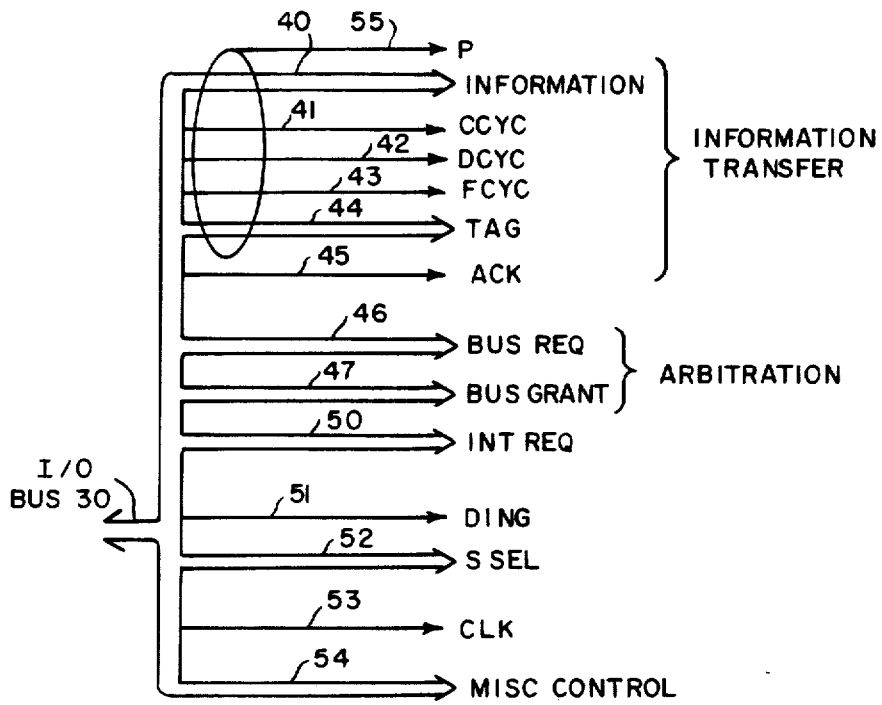
FIG.2
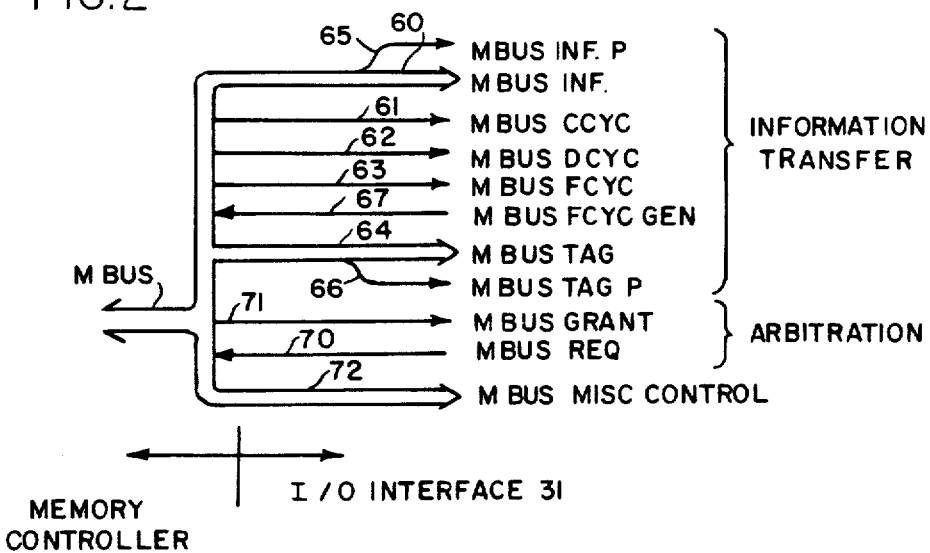
FIG.6   M BUS

I/O BUS
WRITE OPERATION

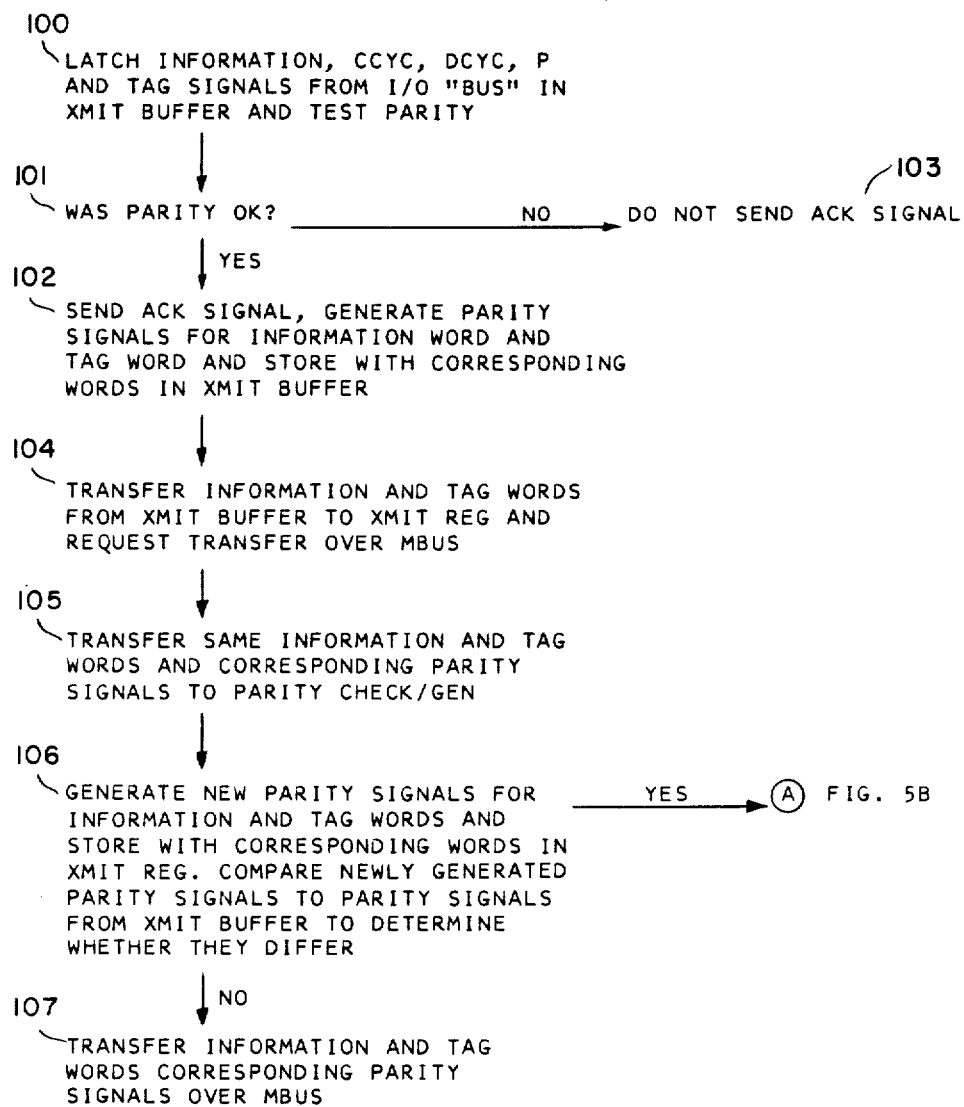

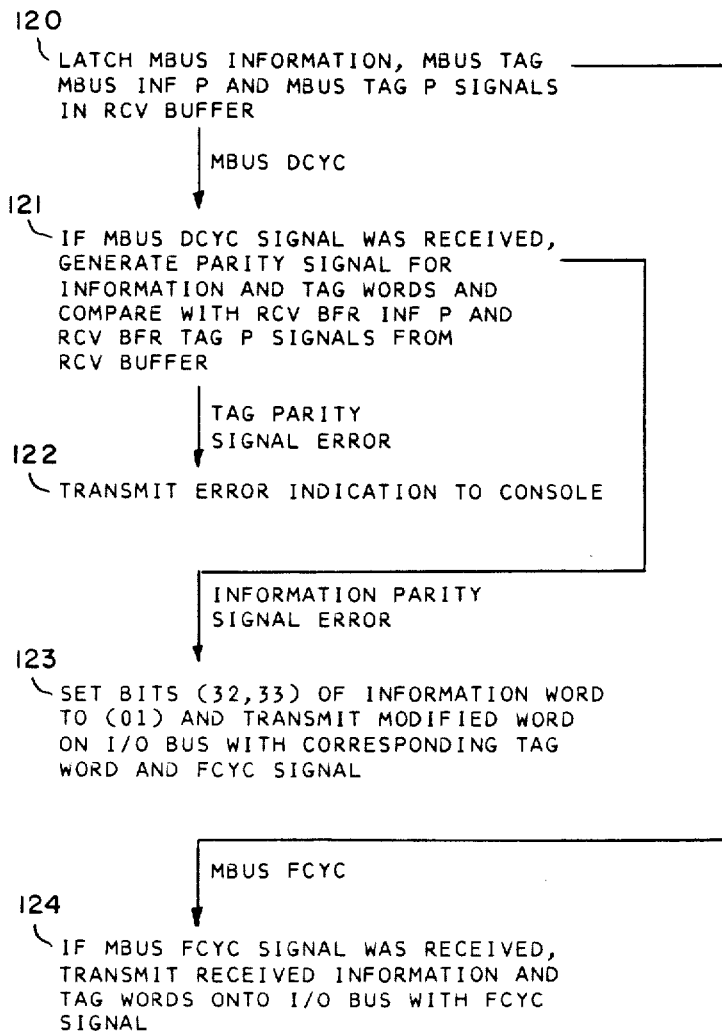
FIG. 5C TRANSFERS RECEIVED FROM MBUS

BUS FOR DATA PROCESSING SYSTEM WITH FAULT CYCLE OPERATION

BACKGROUND OF THE INVENTION

1. Field of the Invention

This invention relates generally to the field of data processing systems and more specifically relates to arrangements for interconnecting the various units forming such a system to enable the rapid and accurate transfer of information among the units. More particularly, the invention relates to an arrangement for transferring information relating to faults or errors in a digital data processing system to facilitate speedy recovery from such faults.

2. Description of the Prior Art

A digital data processing system generally includes three basic elements: a memory element, an input/output element, and a processor element, all of which are interconnected by one or more buses. The memory element stores information, which comprises both data and instructions for processing the data, in addressable storage locations. The processor element retrieves data and instructions from the memory element, processes the data in accordance with the instructions, and returns the processed data to the memory element. Input/output elements include such units as operator consoles, printers, and teletypewriters, by which information may be loaded into and obtained from the system by an operator, and secondary memory storage units such as disk or tape drives which store large amounts of information that can be shifted into and out of the memory element for processing. The processor element can communicate with the input/output elements to initiate these information transfer operations, and the input/output elements can also communicate with the memory element to perform the information transfer.

When certain events occur in the units comprising the data processing system, the unit can "interrupt" the processor element to permit it to ascertain the nature of the event and to perform certain operations which may be necessitated by the event. For example, a disk drive may initiate an interrupt when it has finished performing control operations such as seeks or searches, in which the recording head is moved to the track of the disk which contains the desired information and the disk is rotated until a desired portion of the track has moved under the head. This allows the processor to then initiate a transfer of that information into memory. The disk drive may also interrupt the processor when the transfer is completed, to inform it that the information is now available in memory for processing and that the disk drive itself is also available for other operations. In addition, units may request interrupts in the event of errors or malfunctions that are detected in the operation of the unit requesting the interrupt and in the transfer of information between units over the bus.

When an interrupt request is received, the processor element, when it recognizes, or grants, the interrupt, goes through a lengthy preparatory process of first saving its prior processing state by transmitting the contents of certain of its processing registers to memory, and of retrieving a control program from memory for processing the interrupt. While it is processing the control programs, the processor cannot process user programs, which can reduce the throughput of the system. In some cases the processor may, in fact, be waiting for an interrupt; for example, if the processor is waiting for data stored on a disk drive to be transferred into memory so that it can process the data, the interrupt may indicate to the processor that it can continue processing user programs or begin processing other user programs. However, if the interrupts are the result of errors, such as, for example, information transfer errors, requiring the processor to devote attention to the error may waste the processor's time as the problem may be intermittent and be corrected by the units repeating the transfer operation.

To enable units to repeat transfer operations, in recent years, buses connecting the units in a data processing system have been designed to transmit an acknowledgement or confirmation signal whereby a receiving unit indicates whether the information transfer was properly received. The confirmation signal is typically sent a selected time after the transfer of the information, as described in U.S. Pat. No. 4,232,366 entitled "Bus For Data Processing System With Overlap Sequences", issued to John V. Levy, et al, on Nov. 4, 1980, and assigned to the assignee of the present invention. That patent discloses a bus that is synchronous in operation, that is, it has a single globally-generated clock signal that controls all transfers over the bus. In that bus, a confirmation signal is sent two clock cycles after the corresponding information transfer. During the delay, certain features of the information transferred can be verified such as decoding of an address and checking of parity.

Similarly, U.S. Pat. No. 3,997,896, issued to Frank V. Cassarino, Jr., et al, on Dec. 14, 1976, entitled "Data Processing System Providing Split Bus Operation", discloses a data processing system interconnected by an asynchronous bus, that is, one which does not provide a globally-generated clocking signal that controls transfers over the bus. The bus disclosed in that patent uses a handshake signal to time information transfers between units connected to the bus. In that patent, a portion of the asynchronous handshake constitutes a the confirmation signal for the information transfer.

However, in either system, if the receiving unit determines that a problem has arisen and that it is unable to perform an operation required by the transfer after it has sent the confirmation signal, the unit may also be unable to indicate to either the transmitting unit or to the processor that a problem has occurred. For example, memory controllers are generally not designed to request interrupts, instead relying on the transmission of the confirmation signal to indicate whether an error has occurred. However, in pipelined controllers, which can buffer a number of memory requests and the accompanying data after they have been received and before they can be processed, an example of which is also described in the above-mentioned Levy, et al, patent, the confirmation signals normally must be transferred before the memory request is completed. However, errors can occur while the memory requests are in the buffer. Typically, there is no way for the memory controller to indicate that such errors have occurred. While it would be possible to allow these memory controllers to interrupt the processor in the event of such an error, in many circumstances this would merely be a waste of processor time, as usually all that need be done is to have the transmitting unit retransmit the request and data.

SUMMARY

It is therefore an object of the invention to provide a new and improved data processing system.

It is a further object to provide a new data processing system in which units comprising the system that communicate over a bus can transmit signals indicating that errors have occurred in processing of operations initiated over the bus, after the transfers that gave rise to the operations have been acknowledged, to allow the units to re-initiate the operations and avoid having to interrupt the system processor.

It is yet another object to provide a new and improved unit for connection to a data processing system that is able to detect certain errors that occur when performing operations initiated by other units in the system and to transmit indications that such errors have occurred.

It is also another object to provide a new unit for connection to a data processing system that is able to receive error signals from another unit indicating that the other unit has encountered an error in performing an operation initiated by this unit, and to perform certain operations to correct the error.

In brief summary, the units attached to a bus can receive and transmit signals representing information, including commands that initiate information transfer operations, addresses identifying the location from which data are to be retrieved or to which data are to be stored, and the data itself, as well as signals that identify the nature of the information, whether commands and addresses or data, that is being transferred. In response to the receipt of an information transfer, the unit returns an acknowledgement signal. Each unit also includes an arrangement for determining, during processing of the command, after it has returned the acknowledgement signal, that it is unable to properly process the command. The unit, if it is unable to properly process the command, returns selected information over the information transfer lines to the initiating unit indicating that it is unable to process the command. The initiating unit then may perform error recovery operations such as re-initiating the failed operation.

In addition, the system may include a unit that monitors transfers over the bus and records the error information. A unit returning error information can encode it so that a maintenance technician can determine the source of the error, thereby simplifying diagnosis of errors.

BRIEF DESCRIPTION OF THE DRAWINGs

This invention is pointed out with particularity in the appended claims. The above and further objects and advantages of this invention may be better understood by referring to the following description taken in conjunction with the accompanying drawings, in which:

FIG. 2 illustrates various lines and corresponding signals that constitute one of the buses interconnecting several of the units comprising the digital data processing system depicted in FIG. 1;

FIGS. 5A, 5B and 5C constitute flow diagrams detailing the operations performed by the unit depicted in FIG. 4 in response to receipt of information transferred over the buses depicted in FIG. 2; and FIG. 6 illustrates various lines and corresponding signals that constitute another of the buses interconnecting several of the units comprising the digital data processing system depicted in FIG. 1.

DESCRIPTION OF AN ILLUSTRATIVE EMBODIMENT

Figure 1:
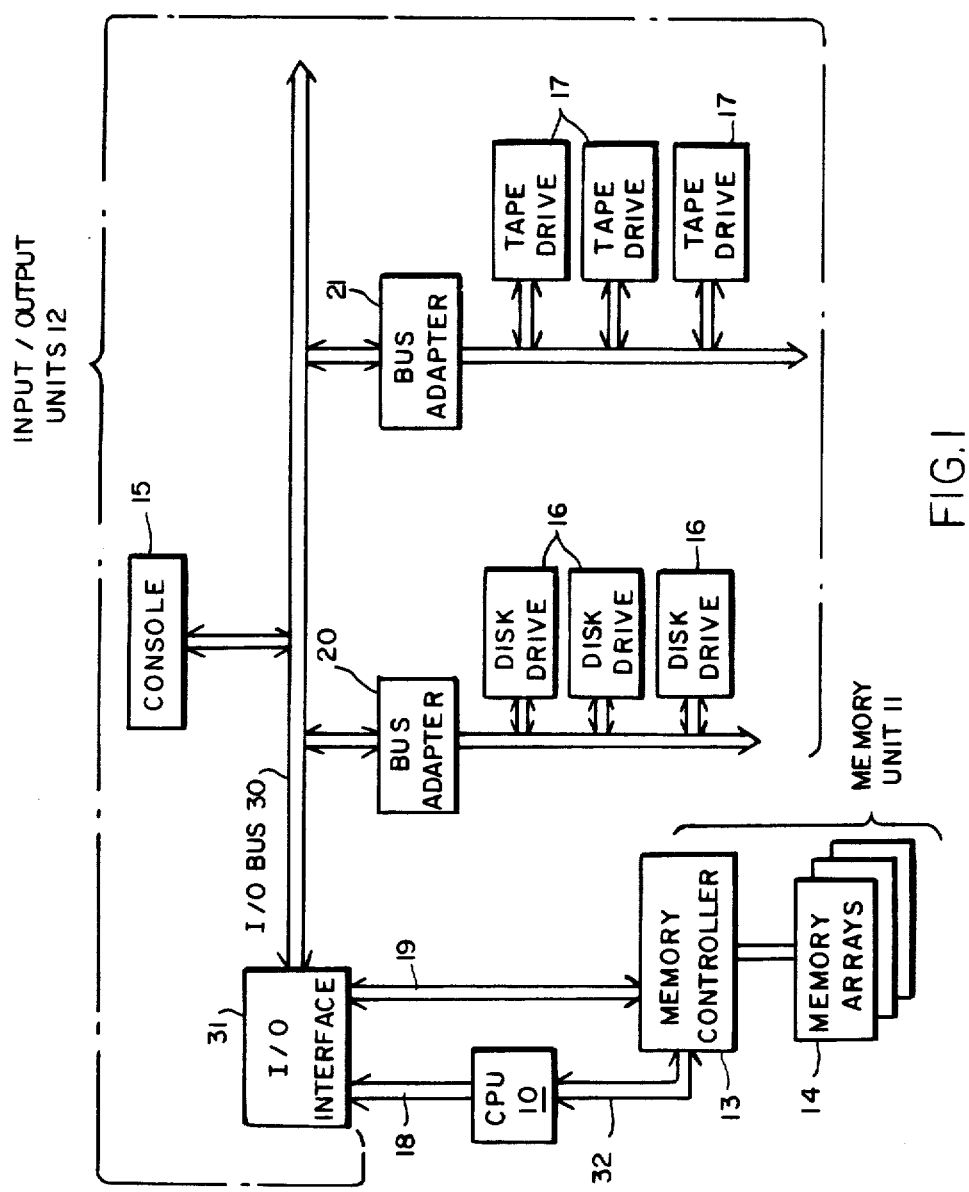
FIG. 1 is a block diagram of a digital data processing system constructed in accordance with this invention.

Referring to FIG. 1, the basic units of the data processing system embodying the invention include a central processing unit (processor) 10, a memory unit 11, and input/output units generally indicated at 12. The processor 10 includes all of the circuitry that is required to process user programs and to control the system in response to programs constituting the operating system. The memory unit 11 connects to the processor over a bus 32 and includes a memory controller 13 that transfers information to and from a plurality of memory arrays 14. The memory controller may also include a cache memory (not shown) which stores information that can be rapidly retrieved by the processor in a conventional manner.

The input/output units 12 include a console 15 which serves as the operator interface to the system. It allows the operator to examine and deposit program and other information, halt the operation of the processor 10, or step the processor through a sequence of program instructions and determine the operations that are performed by the processor and other units in response to those instructions. It also enables an operator to initialize the system and to perform various diagnostic tests on the entire data processing system.

Several other types of input/output units are also depicted in FIG. 1. They include disk drives 16 and tape drive 17 which are connected to bus adapters 20 and 21, respectively. The bus adapters constitute the interfaces to the rest of the system for the disk and tape drives, transferring information to be recorded on, or that has been retrieved from, the recording media. Furthermore, the bus adapters may receive transfer control information to control the operations of the drives and transmit status information indicating the condition of the drives. In addition to the input/output units depicted in FIG. 1, various other input/output devices such as teletypewriters or the familiar video display and keyboard terminals may also be connected to the system.

The console and input/output unit bus adapters are connected to an input/output (I/O) bus 30 and, through an input/output (I/O) interface 31 to processor 10 over bus 18 and memory unit 11 over memory bus 19. The processor and memory unit communicate with the input/output units through I/O interface 31 and I/O bus 30, the processor transmitting signals that initiate operations in the console and bus adapters, and the memory unit transmitting information from and storing information in the addressed storage locations.

Before proceeding further, it may be useful to establish some definitions for terms that have been used and will be used throughout the remainder of this description. A purpose of a bus such as I/O bus 30 is to communicate information between units connected to it in the data processing system. This information may constitute an address, which identifies the location of other information such as user information which is to be transferred, the direction of transfer and the data information which is the object of the transfer. As used herein, the location in memory unit 11, for example, of the information to be transferred is the address, the direction of transfer is the command, and the object of the transfer is data. The data may constitute instructions and operands used by the central processing unit in executing its programs, or control and status information which is used to control the units comprising the system.

As will be apparent, in one specific embodiment of the invention, only console 15 and bus adapters 20 and 21 may transmit a command over I/O bus 30. The I/O interface only receives commands and processes them, retrieving data from an addressed location in memory unit 11 in response to a READ command or depositing information into an addressed location in memory unit 11 in response to a WRITE command. The console 15 and bus adapters constitute commanding units when they transmit a transfer command, and the I/O interface 31 constitutes a responding unit when it processes the command.

The units connected to I/O bus 30 are also defined as either transmitting or receiving units. When the console or a bus adapter 20 or 21 transmit a command and address or data to be stored in memory unit 11, they constitute transmitting units, and the I/O interface 31 constitutes a receiving unit. When, however, the I/O interface is transmitting data information that has been retrieved from memory unit 11 in response to a READ command, it constitutes a transmitting unit, and the console or the bus adapter receiving the information constitutes a receiving unit.

With reference to FIG. 2, I/O bus 30 in one specific embodiment comprises a number of lines. Information lines 40 carry information signals, including the command and address, which are transferred together, and data. A line 41 carries a CACYC command/address cycle signal, which is asserted when the information signals carried by lines 40 constitute a command and address. A line 42 carries a DCYC data cycle signal which is asserted when the information signals on the lines 40 constitute data. Similarly, an FCYC line 43 carries an FCYC fault cycle signal which is asserted when the signals on line 40 constitute fault information indicating that an error has occurred in processing a command as described below. As is apparent, only one of the CCYC, DCYC or FCYC will be asserted at any one time.

Contemporaneously with a transfer of signals over lines 40, and the assertion of one of the CCYC, DCYC and FCYC signals on lines 41, 42 or 43, TAG signals are transmitted over lines 44 which identify the commanding unit for the transfer. Each unit connected to I/O bus 30 has a unique set of TAG signals, which the I/O interface 31 stores and, if the command is a READ command, transmits with the retrieved data to identify the intended recipient of the data, that is, the commanding unit which transmitted the READ command.

A predetermined time after each transfer over lines 40, the receiving unit transfers an ACK acknowledgement signal over line 45. The transfer of the ACK acknowledgement signal is generally delayed to allow the receiving unit to decode the address, if the information is a command and, to check the parity of the information signals that were received from lines 40. In one specific embodiment, in which the I/O bus 30 is a synchronous bus, the acknowledgement signal is returned two clock cycles after the transfer of the information signals. This two-cycle delay permits the receiving unit to decode the address signals and thereby determine that it is the intended recipient, and also to check the parity of the information signals being received.

In addition, input/output bus 30 includes several lines by which the various units arbitrate for access to the information lines 40. Request lines 46 are used by the bus adapters 20 and 21 and I/O interface 31 to request access to the bus information lines 40 and grant lines 47 are used to transfer an indication that the unit has access to the information lines. Each unit has a separate request line and grant line that is assigned to it. In the system depicted in FIG. 1, the arbitration is centralized in console 15. When a unit transmits a bus request signal over its line 46, if it has a higher priority than all units then transmitting bus request signals, the console 15 returns a bus grant signal over the appropriate one of lines 47 associated with that unit.

Similarly, each unit connected to I/O bus 30 has an associated interrupt request line in lines 50. Any unit connected to I/O bus 30 may interrupt the processor 10 by asserting its assigned line in interrupt request lines 50. At that point, the I/O interface 31 can signal the processor 10 that interrupt service is being requested, and the processor 10 can take appropriate action.

Similarly, the processor 10 can initiate certain actions in the input/output units 12 by transferring certain instructions to locations in memory unit 11, and by causing the I/O interface 31 to transmit a DING signal over line 51, accompanied by a device identification signal over SSEL start select lines 52. The start select lines 52 identify the input/output unit which has an instruction pending, and input/output unit may then retrieve the command from memory 11 through I/O interface 31.

In addition to the above lines, I/O bus 30 includes a line 53 that carries a clock signal and various lines generally indicated at 54 that carry miscellaneous command and control signals. These signals may include, for example, a reset signal which initializes input/output units 12, an interlock signal, low power signals, an uncorrectable read data signal, and the like. These signals are commonly used in buses and form no part of the invention, and will not be described in any greater detail.

In addition, the integrity of various of the signals which have been described may be protected by one or more parity signals. In the bus depicted in FIG. 2, the signals on information lines 40 and lines 41, 42, 43 and 44 are protected by a parity signal on line 55.

Figure 3A:
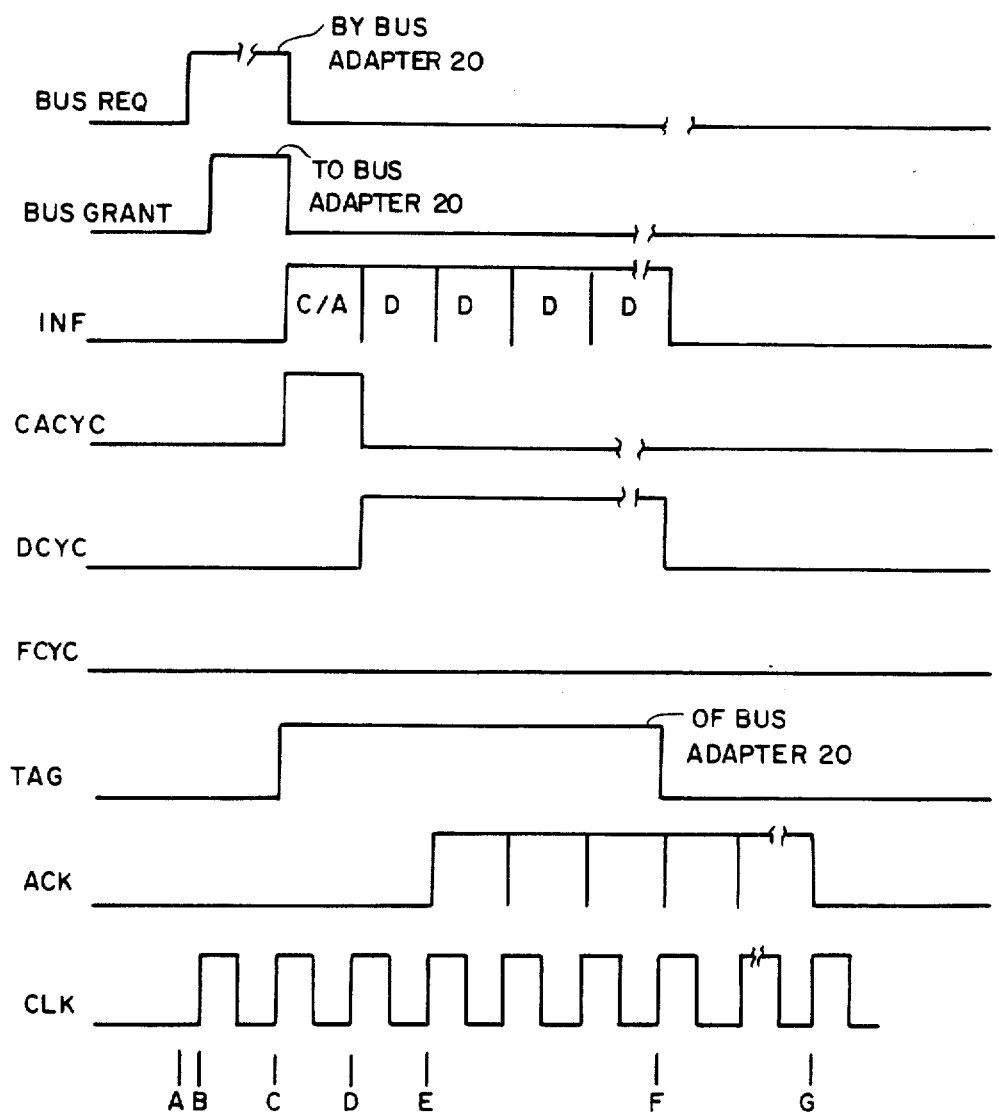
FIGS. 3A and 3B are timing diagrams detailing the transfer of information over the bus depicted in FIG. 2.
Figure 3B:
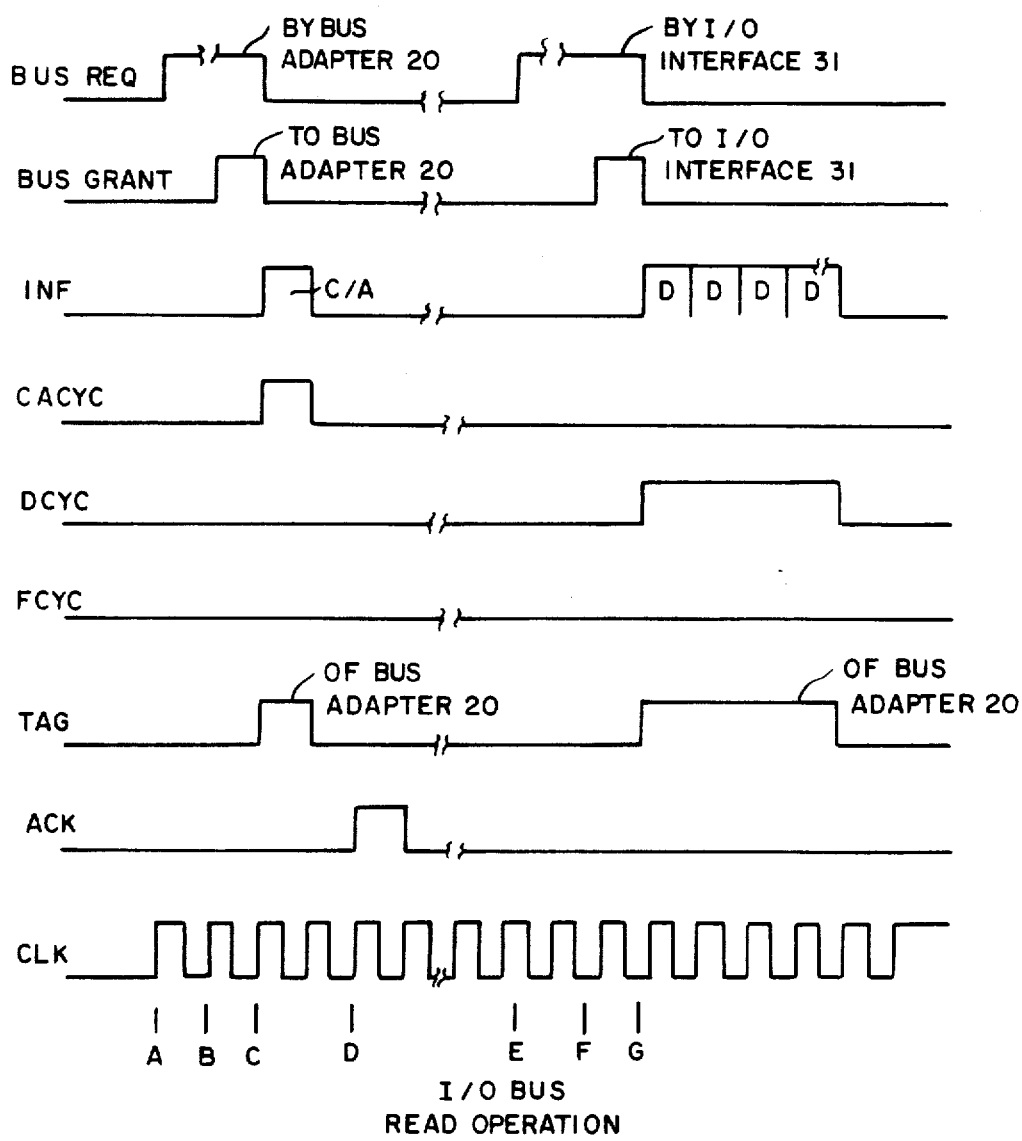

At this point, it will be helpful to describe, in connection with FIGS. 3A and 3B, the signals that are required to transfer information over the I/O bus 30 depicted in FIG. 2. FIG. 3A depicts signals that are transferred during a WRITE operation, in which data is transferred into memory, and FIG. 3B depicts signals that are transferred during a READ operation, during which signals are retrieved from memory. In either case, if bus adapter 20, for example, desires to transfer information over I/O bus 30, it energizes its associated bus request line 46 (Time A, FIGS. 3A and 3B). The arbitration circuitry then energizes the bus grant line 47 associated with bus adapter 20 when no other units of higher priority have energized their bus request lines (Time B, FIGS. 3A and 3B).

After the bus adapter 20 has received the grant signal over the bus grant line, it transmits a command and address over the information lines 40, asserts the CCYC command/address cycle signal on line 41 and transmits its TAG signals on lines 44 (Time C, FIGS. 3A and 3B). The subsequent operations depend on whether the command is a READ or a WRITE command. In either case, however, the I/O interface 31 receives the command and address, and two clock cycles later transmits an ACK acknowledgement signal on line 45 to acknowledge receipt of the command and address information (Time E, FIG. 3A; Time D, FIG. 3B).

If the command is a WRITE command, the I/O interface 31 receives one or more of the WRITE data in the clock cycles next following the receipt of the WRITE command, and the DCYC data cycle signal is asserted on line 42 (Time D, FIG. 3A). For each data transfer received with no parity errors, the I/O interface also transmits an ACK acknowledgement signal over line 45 two clock cycles after the receipt of each item of WRITE data.

For A READ command, however, the bus adapter 20 first transmits the READ command, and the I/O interface 31 later transmits the data retrieved from memory unit 11. Between the transmission of the command and the transmission of the data, I/O bus 30 is available for transfers of other information. Specifically, for the signals transferred over I/O bus 30 in response to a READ command, reference should be made to FIG. 3B. After arbitration and the transfer of the READ command and address and the commanding unit's TAG signals on lines 44, and after the transfer of the ACK acknowledgement signal on line 45 indicating that the command and address were properly received, the I/O interface 31 retrieves the requested READ information, which may constitute one or more words of READ data from memory unit 11. I/O interface 31 prepares to transmit the retrieved READ data onto the I/O bus 30, along with the TAG signals identifying bus adapter 20 as the source of the command. I/O interface 31 energizes its bus request line 46 (Time E, FIG. 3B). When it has the highest priority, console 15 energizes the bus grant line 47 associated with the I/O interface (Time F, FIG. 3B). The I/O interface then begins transmitting the retrieved READ data over the information lines 40, along with the TAG signals of bus adapter 20, and the DCYC data cycle line 42 to indicate that data is being transmitted (Time G, FIG. 3B). The bus adapter 20 may or may not transmit an acknowledgement signal on line 45 for each data word received.

In accordance with the invention, in addition to the command/address and the READ or WRITE data that may be transmitted over I/O bus 30, the units connected to I/O bus 30 may also transmit fault or error information over the bus while transmitting the FCYC fault cycle signal over line 43. Specifically, if I/O interface 32 has received and acknowledged a command and it finds that, due to an error that has occurred in its internal circuitry, it is unable to perform the operation required by the command, it may transmit fault information over the information lines 40 and the TAG signals over lines 44 of the unit that originally transmitted the READ command, using the same sequence depicted in FIG. 3B by which it transmits READ data, except that it asserts the FCYC fault cycle signal instead of the DCYC data cycle signal. The unit receiving the fault cycle information may then perform certain error recovery operations, such as retrying the operation, which may enable it to recover from the error condition without requiring the intervention of processor 10.

Figure 4:
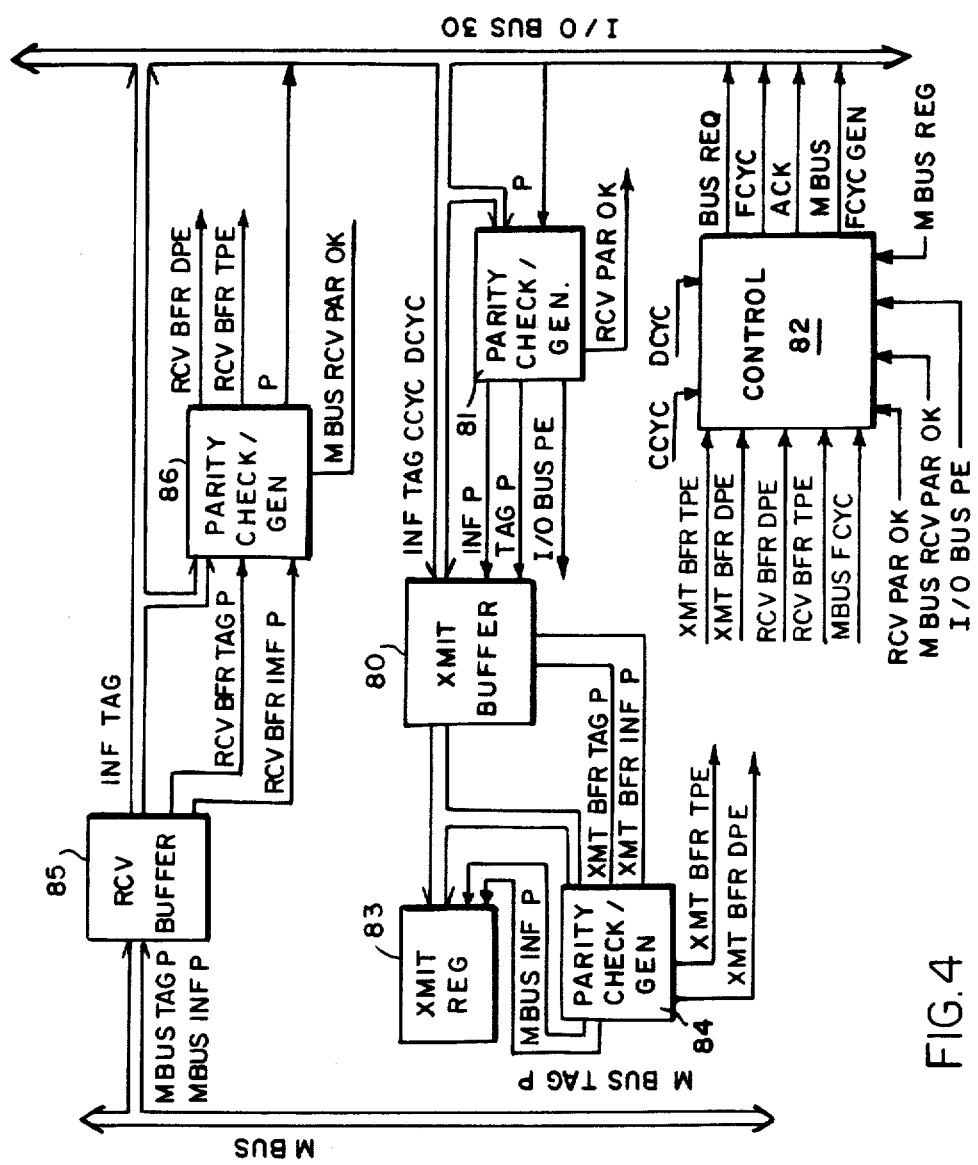
FIG. 4 constitutes a block diagram of one of the units depicted in FIG. 1 and which connects to both of the buses depicted in FIGS 2 and 6.
Figure 5B:
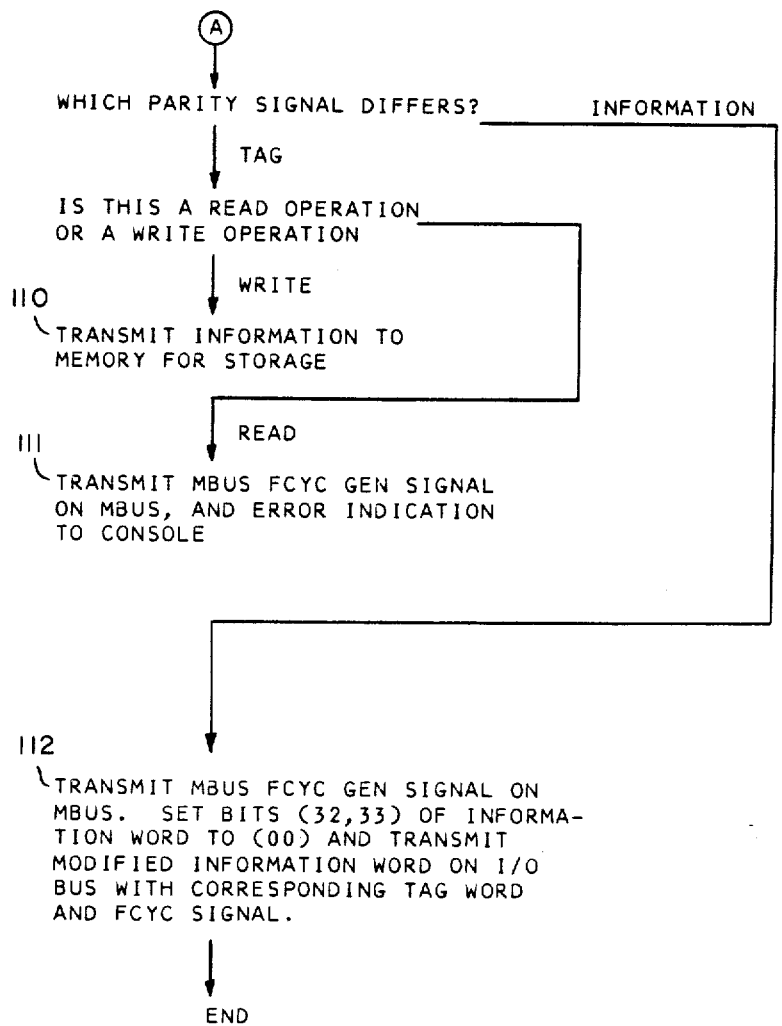

For a more specific discussion of the fault cycle operation, reference should be had first to FIG. 4, which depicts a block diagram of the I/O interface 31, and FIGS. 5A, 5B and 5C, which contain flow diagrams describing certain operations of the I/O interface 31.

The information and TAG signals from lines 40 and 44 of I/O bus 30 are received in a transmit buffer 80 (step 100). These signals plus the CCYC, DCYC, and FCYC signals and the parity signal on lines 41, 42, 43 and 55 are checked for proper parity in a parity checker/generator 81. If the parity is correct, the parity checker/generator 81 generates a RCV PAR OK receive parity okay signal that is transmitted to control 82, which in turn generates the ACK acknowledgement signal and transmits it over line 45 (FIG. 2) (steps 101 and 102). If the parity was not correct, the acknowledgement signal is not sent (step 103), indicating that an error has occurred in the transfer.

In addition to checking parity, parity checker/generator 81 also generates a pair of parity signals, one covering the signals comprising the information signals, and a second parity signal covering the signals comprising the tag signals. These signals, an INF P information parity signal and a TAG P tag parity signal, respectively, are transmitted to the transmit buffer 80 and are stored with the respective information and TAG signals that are stored therein (step 102).

In one specific embodiment, the transmit buffer 80 can store signals from a plurality of bus transfers over I/O bus 30. In that embodiment, the transmit buffer 80 constitutes a first in-first out buffer, in which the information and TAG signals, and their associated parity signals from parity checker/generator 81, shift from the input end, which receives them from I/O bus 30 and parity checker/generator 81, to an output end. When the signals finally reach the output, all but the parity signals are latched in a transmit register 83 (step 104). At this point, the I/O interface 31 prepares to transmit the information and TAG signals over the memory bus (MBUS) 19.

The information and TAG signals from transmit buffer 80 are also transmitted to a second parity checker/generator 84 along with the parity signals that were stored with the corresponding signals in transmit buffer 80. Specifically, the XMT BFR TAG P transmit buffer tag parity signal and the XMT BFR INF P transmit buffer information parity signal are transferred to parity checker/generator 84, which generates newly generated parity signals covering the information and TAG signals and compares the newly generated parity signals with the XMT BFR TAG P and XMT BFR INF P parity signals received from the transmit buffer (step 106). If they are identical, the newly-generated parity signals are also transmitted to the transmit register 83 (step 107) and all of these signals are transmitted over the memory bus.

If, however, the newly generated information parity signal differs from the information parity signal stored in transmit buffer 80, that condition indicates that an error occurred in the information field as the information words and corresponding parity signal were shifted through transmit buffer 80. In that event, the parity checker/generator 84 generates an XMT BFR DPE transmit buffer data parity error signal which is transmitted to control 82.

Similarly, if the newly generated tag parity signal differed from the XMT BFR TAG P transmit buffer tag parity signal received from transmit buffer 80, the parity checker/generator 84 generates an XMT BFR TPE transmit buffer tag parity error signal, which is also transmitted to control 82. The operations performed by I/O interface 31 then depend on whether the XMT BFR TPE or XMT BFR DPE signal is generated, and on whether the command is a READ command or a WRITE command.

If the XMT BFT TPE transmit buffer tag parity error signal is generated, and if the command is a WRITE command, since the information signals are to be stored in memory unit 11, the error is ignored and control 82 allows the transfer to proceed and the information to be transmitted from transmit register 83 to memory controller 13 (step 110).

However, if the operation is a read operation, an error in the TAG signals would prevent the READ data from reaching the unit that requested the data. Accordingly, control 82 transmits a signal over memory bus 19 indicating that an error has occurred and also transmits an error indication to console 15 (step 111) for diagnostic purposes.

If, however, parity checker/generator 84 is asserting the XMT BFR DPE transmit buffer data parity error signal, indicating an error in the information field, control 82 also transmits the error signal over memory bus 19 (FIG. 4)(step 112). In addition, control 82 causes bits 32 and 33 of the information word in transmit register 83 to be set to a specific code, in one embodiment to (00). As thus modified, the information word is then transmitted onto information lines 40 of I/O bus 30, along with the corresponding TAG signals and the FCYC signal on line 43.

The unit connected to I/O bus 30 identified by the TAG signals on lines 44 receives the modified information word from lines 40. The unit may then retry the transfer. If, after a selected number of attempts at the transfer, the I/O interface 31 is unable to complete the transfer, only then will the commanding unit transmit an interrupt request to processor 10.

If the I/O interface 31 successfully transmits the information and TAG to the memory, and if the command is a READ command, the memory controller, on returning the READ data, returns TAG signals to the I/O interface along with the READ data as well as parity signals separately covering the TAG and information signals. These signals are received by the interface unit and stored in a receive buffer 85.

Like transmit buffer 80, receive buffer 85 allows for pipelined operation, buffering transfers between the memory bus and I/O bus 30 (FIG. 5C, step 120). When the stored signals reach the output end of the receive buffer 85, the control 82 transmits a bus request over the I/O bus 30. The information, TAG, RCV BFR TAG P receive buffer tag parity and RCV BFR INF P receive buffer information parity signals are transmitted to a parity checker/generator 86 which generates a single parity signal for transmission over line 55 (FIG. 2) of I/O bus 30. In addition, in a manner similar to that of parity checker/generator 84, parity checker/generator 86 also generates a parity signal based separately on the information signals and TAG signals that were received from the receive buffer 85, and compares it to the RCV BFR TAG P and RCV BFR INF P TAG and information parity signals that it receives from the receive buffer 85. If the newly generated parity signals are identical to the RCV BFR TAG P and RCV BFR INF P signals, the control 82 proceeds with the transfer over I/O bus 30 as described above with respect to FIG. 3B.

However, if either newly-generated parity signal differs from the respective parity signals as received from the receive buffer 85, the operations performed by the I/O interface depend on which parity signal differs. For example, if the newly generated TAG parity signal differs from the RCV BFR TAG P receive buffer tag parity signal, the parity checker/generator 86 generates an RCV BFR TPE receive buffer tag parity error signal, and the control 82 transmits an error indication to the console 15 (step 122), as the I/O interface is unable to verify that the TAG signals that it is prepared to transmit identify the unit that initiated the operation, that is, the commanding unit for this transfer.

If, however, the newly-generated information parity signal differs from the RCV BFR INF P receive buffer information parity signal, the parity checker/generator 86 generates an RCV BFR DPE receive buffer data parity error signal. In this case, the TAG signals in receive buffer 85 properly identify the commanding unit for the transfer. The control 82 sets bits 32 and 33 of the information signals stored at the output of receive buffer 85 to (01) and transmits the information word, as modified, over I/O bus 30 with the corresponding TAG signals and the FCYC fault cycle signal (step 123).

On receipt of the FCYC fault cycle signal from line 43, the commanding unit identified by the TAG signals latches the information from lines 40. The bus adapter may then retry the operation a selected number of times. If the I/O interface 31 is unable to complete the operation within the selected number of attempts, the bus adapter may then signal an interrupt. However, if the I/O interface 31 is able to successfully complete a transfer within the allotted number of retries, the transfer can complete without the requirement of an interrupt.

As a further feature of the invention, the memory controller 13 can also initiate a fault cycle transfer over memory bus 19, which the I/O interface 31 then transmits onto I/O bus 30 as a fault cycle transfer. The memory controller in one specific embodiment initiates fault cycle transfers in response to, for example, an address identifying a memory location for which there is no storage element (non-existent memory location), an error in the cache directory or a data parity error in buffers located in memory controller 13 similar to the transmit and receive buffers 80 and 85 in I/O interface 31.

More specifically, for a detailed understanding of the process by which memory controller 13 initiates a fault cycle transfer over memory bus 19 and, through I/O interface 31, over I/O bus 30, reference should be had to FIG. 6, which depicts lines comprising one specific embodiment of memory bus 19.

Many of the signals, particularly MBUS INF memory bus information signals transmitted over lines 60, an MBUS CCYC memory bus command/address cycle signal transmitted over line 61, an MBUS DCYC memory bus data cycle signal transmitted over line 62, an MBUS FCYC memory bus fault cycle signal transmitted over line 63, and an MBUS TAG memory bus tag signals transmitted over lines 64, are virtually identical to the corresponding information, CCYC, DCYC, FCYC, and TAG signals that are transmitted over I/O bus 30 and depicted in FIG. 2. In addition, the memory bus 19 includes a line 65 which carries an information parity signal covering signals transmitted over the lines 60, and a line 66 that carries a TAG parity signal covering the TAG signals.

In addition to lines 60 through 66, which carry information, memory bus 19 includes two arbitration lines, one of which, line 70, carries an MBUS REQ memory bus request signal from I/O interface 31 to memory controller 13. The second arbitration line, line 71, carries an MBUS GRANT memory bus grant signal from memory controller 13 to I/O interface 31, which enables the I/O interface to transmit signals over the information transfer lines 60 through 66.

Finally, there are a plurality of miscellaneous control signals that are transmitted over lines 72, including clocking signals, various error signals and the like.

In addition, the I/O interface 31 generates an MBUS FCYC GEN signal over line 67. As has been mentioned, when an error is detected by parity checker/generator 84, except for TAG parity errors during a WRITE operation, the control 82 energizes the MBUS FCYC GEN fault cycle generated signal to indicate to memory controller 13 that an error has occurred.

The signals transmitted during transfers over the memory bus 19 are very similar to signals transmitted during transfers over the I/O bus 30 as depicted in FIGS. 3A and 3B. The differences are, first, that the memory controller 13 maintains the MBUS GRANT memory bus grant signal in an asserted condition during the entire time of an information transfer over lines 60, and second, that no acknowledgement signal is transmitted by either the I/O interface 31 or the memory controller 13.

When I/O interface 31 receives information signals from memory controller 13 on lines 60, the operations performed by the I/O interface depend on whether they are accompanied by an MBUS DCYC data cycle signal or an MBUS FCYC fault cycle signal. The memory controller 13 does not transmit the MBUS CCYC command/address cycle signal to the I/O interface. If the I/O interface receives the MBUS DCYC signal, it latches the information in receive buffer 85 and proceeds as described above (FIG. 5C, steps 120–123, if an error occurs). However, if the MBUS FCYC memory bus fault cycle signal is received on line 63, that signal causes control 82 to initiate a fault cycle transfer over I/O bus 30. The control 82 transmits the FCYC fault cycle signal on line 43 of I/O bus 30 in conjunction with the information and TAG signals from memory bus 19 (FIG. 5C, step 124).

As has been mentioned, the I/) interface may transmit error indications directly to console 15. These transfers are primarily not fault cycle transfers and may occur, for instance, if the I/O interface is unable to identify the commanding unit of a transfer because of a TAG parity signal error. In addition, console 15 may include a circular buffer (not shown) that receives and stores a selected number of transfers over I/O bus 30, and specifically the transfers in which the fault cycle signal FCYC is asserted on line 43 (FIG. 2). Because of the code inserted into the information signals by control 82 in steps 112 (FIG. 5A-2) and 123 (FIG. 5B), a maintenance technician may identify a likely source of an error. Specifically, if the bits 32 and 33 of the information stored in the buffer in console 15 are set to (0,0), a maintenance technician can identify the probable source of the error as transmit buffer 80 (FIG. 5). However, if the stored bits 32 and 33 are set to (01), a maintenance technician can identify the source of the error as receive buffer 85. Furthermore, memory controller 13 can set bits in the information transmitted by it to identify the likely source of errors detected by it. In this manner, the source of an error can be quickly identified.

It can be seen that by returning the information word to the commanding unit, the commanding unit that initiated the transaction that resulted in the fault cycle operation, the initiating unit may be able to identify the information which gave rise to the error and attempt to recover the error by retransmitting the information. The commanding unit may be able to identify the information that was involved in the error and repeat the transfer.

Furthermore, the invention allows the I/O interface 31 to facilitate pipeline operation with memory controller 13; that is, the invention allows the I/O interface 31 to receive a number of memory requests from the units attached to I/O bus 30 and to insure the integrity of the data stored in the memory and the data returned to the requesting bus adapter. This can be done while minimizing interrupt requests from processor 10, thereby allowing it to process user programs more quickly.

The foregoing description is limited to a specific embodiment of this invention. It will be apparent, however, that this invention can be practiced in data processing systems having diverse basic construction or in systems that use different internal circuitry than is described in this specification with the attainment of some or all of the foregoing objects and advantages. Therefore it is the object of the appended claims to cover all such variations and modifications as come within the true spirit and scope of this invention.

What is claimed as new and desired to be secured by Letters Patent of the United States is:

1. An input/output interface unit for engaging in fault cycle operations, said interface unit being for attachment to a data processing system including a plurality of units interconnected by a bus, the bus including lines for transferring information signals including signals representing commands, addresses and data, lines for transferring unit identification signals, and lines for transmitting a confirmation signal indi,cating that the information signals had been received, said interface unit comprising:

(A) means for connection to said information signal transfer lines and the confirmation signal lines for receiving information signals from the bus, said information signal receiving means including means for transmitting a confirmation signal indicating receipt of the information signals;

(B) means connected to said information signal receiving means for processing the command and address signals received from said information signal receiving means;

(C) means connected to said processing means for determining whether an error has occurred during processing of command and address signals following transmission of a confirmation signal; and (D) means connected to said error detection means and for connection to said information signal transfer lines for transmitting predetermined data signals over the information signal transfer lines to the unit that transmitted the command and address signals, to thereby indicate that it is unable to process the command.

2. An interface unit as defined in claim 1 further including means for connection to said unit identification signal transfers lines for receiving and storing the unit identification signals during a transfer of command and address signals, and means connected to said error detection means and for connection to said unit identification signal transfer lines for transmitting the stored unit identification signals over the unit identification signal transfer lines when it transfers the predeterminded data over the system bus information signal transfer lines.

3. An interface unit as defined in claim 1 wherein said bus further includes lines for transferring signal identifying the type of the information transferred over the information transfer lines as being commands, addresses, data or said predetermined data, said unit further including means for generating a signal for transmission over said information type identification signal indicating that the information transmitted over the information transfer means constitutes the predetermined data.

4. An input/output bus adapter unit for attachment to a data processing system including a plurality of units interconnected by a bus including lines for transferring information including commands, addresses and data, lines for transferring a unit identification, and lines for transmitting a confirmation signal indicating that the information has been received, said adapter unit comprising:
  (A) information signal transfer means for connection to said information signal transfer lines for transmitting information signals onto and receiving information signals from said bus;
  (B) means for connection to said confirmation signal transfer lines and connected to said information signal transfer means for receiving a confirmation signal a predetermined time after transmitting an information signal over said information signal transfer means;
  (C) error signal receiving means for connection to said information signal transfer lines for receiving signals from the bus after receipt of a confirmation signal from said confirmation signal transfer means indicating that an error has occurred in another unit to which it has transmitted a command; and
  (D) means connected to said error signal receiving means for using the information stored in the error signal receiving means.

5. A bus adapter unit as defined in claim 4 wherein said bus further includes lines for transferring unit identification signals and a line for transferring an error signal, said unit further including means for connection to said unit identification signal transfer lines and said error signal transfer line for receiving and storing said information signals in response to the coincidence of said error signal and said unit identification signal.

6. A data processing system comprising a plurality of units connected by a bus including lines for transferring information signals including command, address and data signals, and lines for transferring a confirmation signal, one of said units comprising:
  (A) means connected to said information signal transfer lines and the confirmation signal lines for receiving information signals from the bus, said information signal receiving means including means for transmitting a confirmation signal indicating receipt of the information a predetermined time after receipt of the information signals;
  (B) means connected to said information signal receiving means for processing the command and address signals received from said information signal receiving means;
  (C) means connected to said processing means for determining whether an error has occurred during processing of command and address signals following transmission of a confirmation signal; and
  (D) means connected to said error detection means and said information signal transfer lines for transmitting predetermined data signals over the information signal transfer lines to the unit that transmitted the command and address signals, to thereby indicate that it is unable to process the command; and a second of said units comprising
  (A) information signal transfer means connected to said information signal transfer means for transmitting information signals onto and receiving information signals from said bus;
  (B) means connected to said confirmation signal transfer means and said information signal transfer means for receiving a confirmation signal a predetermined time after transmitting an information signal over said information signal transfer means;
  (C) error signal receiving means connected to said information signal transfer means for receiving signals from the bus after receipt of a confirmation signal from said confirmation signal transfer means indicating that an error has occurred in another unit to which it has transmitted a command; and
  (D) means connected to said error signal receiving means for using the information stored in the error signal receiving means.

7. A data processing system as defined in claim 6 further including means for connection to said unit identification signal transfer lines for receiving and storing the unit identification signals during a transfer of command and address signals, and means connected to said error detection means and for connection to said unit identification signal transfer lines for transmitting the stored unit identification signals over the unit identification signal transfer lines when it transfers the predetermined data over the system bus information signal transfer lines.

8. A data processing system as defined in claim 6 wherein said bus further includes lines for transferring signal identifying the type of the information transferred over the information transfer lines as being commands, addresses, data or said predetermined data, said unit further including means for generating a signal for transmission over said information type identification signal indicating that the information transmitted over the information transfer means constitutes the predetermined data.

9. A data processing system as defined in claim 6 wherein said bus further includes lines for transferring unit identification signals and a line for transferring an error signal, said unit further including means for connection to said unit identification signal transfer lines and said error signal transfer line for receiving and storing said information signals in response to the coincidence of said error signal and said unit identification signal.

* * * * *